United States Patent
Vongsouvanh et al.

(10) Patent No.: US 10,708,259 B2
(45) Date of Patent: *Jul. 7, 2020

(54) AUTHORIZATION FLOW INITIATION USING SHORT-TERM WIRELESS COMMUNICATION

(71) Applicant: Google LLC, Mountain View, CA (US)

(72) Inventors: Alain Vongsouvanh, Sunnyvale, CA (US); Claudio Cherubino, Mountain View, CA (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/169,786

(22) Filed: Oct. 24, 2018

(65) Prior Publication Data

US 2019/0068575 A1    Feb. 28, 2019

Related U.S. Application Data

(63) Continuation of application No. 16/057,783, filed on Aug. 7, 2018, now Pat. No. 10,148,647, which is a
(Continued)

(51) Int. Cl.
*H04L 29/06* (2006.01)
*H04W 12/06* (2009.01)
(Continued)

(52) U.S. Cl.
CPC ........ *H04L 63/083* (2013.01); *H04L 63/0492* (2013.01); *H04L 63/08* (2013.01);
(Continued)

(58) Field of Classification Search
None
See application file for complete search history.

(56) References Cited

U.S. PATENT DOCUMENTS

| 6,898,711 B1 | 5/2005 | Bauman et al. |
| 8,392,971 B1 | 3/2013 | Kates et al. |

(Continued)

FOREIGN PATENT DOCUMENTS

| EP | 2384040 A1 | 11/2011 |
| WO | 2011103916 A1 | 9/2011 |

(Continued)

OTHER PUBLICATIONS

Hardt; RFC 6749 The OAuth 2.0 Authorization Framework; 2012; Retrieved from the Internet URL: https://tools.ietf.org/pdf/rfc6749.pdf; pp. 1-76, as printed. (Year: 2012).*

(Continued)

*Primary Examiner* — Saleh Najjar
*Assistant Examiner* — Michael W Chao
(74) *Attorney, Agent, or Firm* — Shumaker & Sieffert, P.A.

(57) ABSTRACT

In general, aspects of the disclosure are directed towards techniques for initiating an authorization flow with a user to enable a user interface-limited client computing device to obtain access to protected resources hosted by a resource service. In some aspects, a computing device comprises at least one processor. The computing device also comprises a short-range wireless communication module operable by the at least one processor to receive, using short-range wireless communication, an authentication request from a client device. The computing device also comprises an authorization module operable by the at least one processor to receive authorization to provide at least one security credential to the client device, wherein the authorization module is further configured to, responsive to receiving the authorization, send an indication of the authorization to an authentication service.

20 Claims, 9 Drawing Sheets

Related U.S. Application Data continuation of application No. 15/817,923, filed on Nov. 20, 2017, now Pat. No. 10,110,598, which is a continuation of application No. 14/713,765, filed on May 15, 2015, now abandoned, which is a continuation of application No. 13/837,062, filed on Mar. 15, 2013, now Pat. No. 9,038,142.

(60) Provisional application No. 61/761,202, filed on Feb. 5, 2013.

(51) Int. Cl.
  *H04W 12/08* (2009.01)
  *H04L 29/08* (2006.01)

(52) U.S. Cl.
  CPC ...... *H04L 63/0807* (2013.01); *H04L 63/0815* (2013.01); *H04L 63/0853* (2013.01); *H04L 63/0884* (2013.01); *H04L 63/10* (2013.01); *H04L 63/18* (2013.01); *H04L 67/10* (2013.01); *H04W 12/06* (2013.01); *H04W 12/08* (2013.01)

(56) References Cited

U.S. PATENT DOCUMENTS

| | | | |
|---|---|---|---|
| 8,478,195 B1* | 7/2013 | Hewinson | H04B 5/0031 235/379 |
| 8,544,068 B2* | 9/2013 | Yates | H04L 63/101 726/21 |
| 8,689,296 B2 | 4/2014 | Shewchuk et al. | |
| 8,776,204 B2* | 7/2014 | Faynberg | G06F 21/31 726/10 |
| 8,850,196 B2 | 9/2014 | Blanco et al. | |
| 8,856,957 B1 | 10/2014 | Roth et al. | |
| 8,955,149 B1 | 2/2015 | Baer et al. | |
| 8,973,108 B1 | 3/2015 | Roth et al. | |
| 9,070,366 B1 | 6/2015 | Mathias et al. | |
| 9,098,678 B2 | 8/2015 | Hao et al. | |
| 9,418,658 B1 | 8/2016 | David et al. | |
| 9,485,248 B2* | 11/2016 | Schmoyer | H04L 63/0807 |
| 9,571,282 B1 | 2/2017 | Aggarwal et al. | |
| 9,628,875 B1 | 4/2017 | Roth et al. | |
| 9,723,003 B1 | 8/2017 | McClintock et al. | |
| 9,749,844 B1* | 8/2017 | Sovani | H04W 48/16 |
| 9,800,573 B1 | 10/2017 | Aggarwal et al. | |
| 9,819,710 B2 | 11/2017 | Anderson et al. | |
| 9,942,750 B2 | 4/2018 | McDonald et al. | |
| 10,063,592 B1* | 8/2018 | McClintock | H04L 63/0869 |
| 10,104,525 B1* | 10/2018 | Kaiser | H04B 5/0031 |
| 10,110,598 B2 | 10/2018 | Vongsouvanh et al. | |
| 10,129,299 B1* | 11/2018 | McClintock | H04L 63/0869 |
| 10,148,647 B1 | 12/2018 | Vongsouvanh et al. | |
| 10,452,084 B2* | 10/2019 | Zywicki | G05D 23/1905 |
| 10,606,535 B2* | 3/2020 | Chang | H04L 67/04 |
| 2003/0061503 A1 | 3/2003 | Katz et al. | |
| 2004/0003252 A1 | 1/2004 | Dabbish et al. | |
| 2004/0185839 A1 | 9/2004 | Seligmann et al. | |
| 2005/0015604 A1 | 1/2005 | Sundararajan et al. | |
| 2005/0086493 A1 | 4/2005 | Ishidoshiro | |
| 2006/0224882 A1 | 10/2006 | Chin | |
| 2007/0050618 A1 | 3/2007 | Roux et al. | |
| 2007/0249286 A1* | 10/2007 | Ma | H04L 63/08 455/41.3 |
| 2009/0006846 A1 | 1/2009 | Rosenblatt | |
| 2010/0049975 A1* | 2/2010 | Parno | H04L 63/08 713/168 |
| 2010/0058064 A1* | 3/2010 | Kirovski | H04L 9/3073 713/176 |
| 2010/0082784 A1* | 4/2010 | Rosenblatt | H04L 12/2812 709/222 |
| 2010/0251353 A1 | 9/2010 | Hodgkinson | |
| 2010/0260348 A1 | 10/2010 | Bhow et al. | |
| 2010/0268955 A1 | 10/2010 | Ohno et al. | |
| 2011/0040971 A1 | 2/2011 | Lakshminarayanan et al. | |
| 2011/0167256 A1* | 7/2011 | Lee | H04L 63/104 713/156 |
| 2011/0214158 A1 | 9/2011 | Pasquero et al. | |
| 2011/0219427 A1 | 9/2011 | Hito et al. | |
| 2011/0270751 A1 | 11/2011 | Csinger et al. | |
| 2011/0271099 A1 | 11/2011 | Preiss et al. | |
| 2011/0314168 A1 | 12/2011 | Bathiche et al. | |
| 2011/0319056 A1 | 12/2011 | Toy et al. | |
| 2012/0117626 A1* | 5/2012 | Yates | H04L 9/3213 726/4 |
| 2012/0117629 A1 | 5/2012 | Miyazawa et al. | |
| 2012/0136936 A1 | 5/2012 | Quintuna | |
| 2012/0144501 A1 | 6/2012 | Vangpat et al. | |
| 2012/0151100 A1 | 6/2012 | Roche et al. | |
| 2012/0239936 A1 | 9/2012 | Holtmanns et al. | |
| 2012/0284506 A1 | 11/2012 | Kravitz et al. | |
| 2013/0024880 A1* | 1/2013 | Moloney-Egnatios | H04N 21/4122 725/14 |
| 2013/0024919 A1 | 1/2013 | Wetter et al. | |
| 2013/0036476 A1 | 2/2013 | Roever et al. | |
| 2013/0086645 A1* | 4/2013 | Srinivasan | H04L 63/10 726/4 |
| 2013/0110264 A1* | 5/2013 | Weast | G06F 19/3481 700/91 |
| 2013/0124672 A1 | 5/2013 | Pan | |
| 2013/0139271 A1 | 5/2013 | Arrelid et al. | |
| 2013/0185784 A1* | 7/2013 | Tamura | H04L 63/0815 726/9 |
| 2013/0191884 A1 | 7/2013 | Leicher et al. | |
| 2013/0227038 A1 | 8/2013 | Rich | |
| 2013/0317635 A1* | 11/2013 | Bates | H04R 27/00 700/94 |
| 2013/0346508 A1 | 12/2013 | Li et al. | |
| 2013/0347022 A1* | 12/2013 | Bates | H04N 21/25816 725/25 |
| 2014/0006483 A1 | 1/2014 | Garmark et al. | |
| 2014/0006605 A1 | 1/2014 | Frei et al. | |
| 2014/0020070 A1* | 1/2014 | Angal | G06F 21/44 726/5 |
| 2014/0026193 A1* | 1/2014 | Saxman | G06F 21/33 726/4 |
| 2014/0028817 A1 | 1/2014 | Brockway et al. | |
| 2014/0033279 A1* | 1/2014 | Nimashakavi | H04L 63/0807 726/4 |
| 2014/0033280 A1* | 1/2014 | Nimashakavi | H04L 63/0807 726/4 |
| 2014/0045454 A1 | 2/2014 | Monjas Llorente et al. | |
| 2014/0068744 A1* | 3/2014 | Bran | H04W 12/003 726/9 |
| 2014/0068746 A1* | 3/2014 | Gonzalez Martinez | H04L 63/0884 726/9 |
| 2014/0075513 A1 | 3/2014 | Trammel et al. | |
| 2014/0095874 A1 | 4/2014 | Desai et al. | |
| 2014/0096219 A1 | 4/2014 | Lang et al. | |
| 2014/0105103 A1* | 4/2014 | Nethi | H04L 63/1408 370/328 |
| 2014/0143784 A1 | 5/2014 | Mistry et al. | |
| 2014/0143837 A1 | 5/2014 | Fletcher et al. | |
| 2014/0007195 A1 | 6/2014 | Gupta | |
| 2014/0156791 A1 | 6/2014 | Sant et al. | |
| 2014/0172140 A1 | 6/2014 | Buck | |
| 2014/0173026 A1 | 6/2014 | Buck et al. | |
| 2014/0189797 A1* | 7/2014 | Nori | H04L 63/0807 726/4 |
| 2014/0189808 A1* | 7/2014 | Mahaffey | H04L 63/083 726/4 |
| 2014/0189841 A1 | 7/2014 | Metke et al. | |
| 2014/0223516 A1 | 8/2014 | Vongsouvanh et al. | |
| 2014/0337959 A1 | 11/2014 | Garmark et al. | |
| 2014/0380428 A1* | 12/2014 | Kobayashi | G06F 21/335 726/4 |
| 2015/0128237 A1* | 5/2015 | Lund | H04L 63/08 726/7 |
| 2015/0222635 A1 | 8/2015 | Yang et al. | |

(56) References Cited

U.S. PATENT DOCUMENTS

| | | | |
|---|---|---|---|
| 2015/0249659 | A1 | 9/2015 | Vongsouvanh et al. |
| 2015/0295901 | A1 | 10/2015 | Woodward et al. |
| 2016/0057139 | A1 | 2/2016 | McDonough et al. |
| 2016/0087933 | A1 | 3/2016 | Johnson et al. |
| 2016/0347280 | A1 | 12/2016 | Daman et al. |
| 2017/0223807 | A1* | 8/2017 | Recker ................. H02J 7/34 |
| 2017/0272316 | A1 | 9/2017 | Johnson et al. |
| 2018/0351938 | A1 | 12/2018 | Vongsouvanh et al. |
| 2019/0068575 | A1 | 2/2019 | Vongsouvanh et al. |
| 2020/0097225 | A1* | 3/2020 | Chang ................. H04L 63/0492 |

FOREIGN PATENT DOCUMENTS

| | | | |
|---|---|---|---|
| WO | 2012069263 | A2 | 5/2012 |
| WO | 2012156785 | A1 | 11/2012 |

OTHER PUBLICATIONS

"BlueProximity manual", [online]. Sourceforge. First Accessed on Mar. 25, 2011. Retrieved from the Internet: <http://blueproximity.sourceforge.nel/manual.html> 10 pgs.

"BlueProximity", [online]. Sourceforge. First Accessed on Mar. 25, 2011. Retrieved from the Internet: <http://blueproximity.sourceforge.nel/> 1 pg.

"LockItNow! 1.2", [online]. Bluetooth Shareware. First Accessed on Mar. 25, 2011. Retrieved from the Internet: <http://www.blueshareware.com/lockitnow.asp> 5 pgs.

"LockItNow! FAQ", [online]. Bluetooth Shareware. First Accessed on Mar. 25, 2011. Retrieved from the Internet: <http://www.blueshareware.com/lockitnow_faq.asp> 2 pgs.

International Preliminary Report on Patentability from International Application No. PCT/US2014/014435, dated Aug. 20, 2015, 8 pp.

International Search Report and Written Opinion of International application No. PCT/US2014/014435, dated Apr. 23, 2014, 11 pp.

Pash. "Automate Proximity and Location-Based Computer Actions", [online]. Lifehacker, Jun. 5, 2007. Retrieved from the Internet: <http:l/lifehacker.com/265822/automate-proximity-and-location+based-computer-actions> 3 pgs.

Prosecution History from U.S. Appl. No. 13/837,062 from Jul. 16, 2014 through Apr. 6, 2015 45 pp.

Prosecution History from U.S. Appl. No. 14/713,765 from Dec. 2, 2016 through Sep. 15, 2017 46 pp.

Prosecution History from U.S. Appl. No. 15/817,923 from Feb. 21, 2018 through Jul. 2, 2018 31 pp.

Notice of Allowance from U.S. Appl. No. 16/057,783 dated Oct. 18, 2018 11 pp.

Notice of Allowance from U.S. Appl. No. 16/057,780, dated Nov. 7, 2018, 11 pp.

Office Action from U.S. Appl. No. 16/184,425, dated Nov. 13, 2019, 26 pp.

Amendment in Response to Office Action dated Nov. 13, 2019, from U.S. Appl. No. 16/184,425, filed Feb. 13, 2020, 10 pp.

Prosecution History from U.S. Appl. No. 16/057,780 from Nov. 7, 2018 through Feb. 15, 2019, 12 pp.

Notice of Allowance from U.S. Appl. No. 16/184, 425 dated Mar. 11, 2020, 17 pp.

* cited by examiner

AUTHORIZATION FLOW INITIATION USING SHORT-TERM WIRELESS COMMUNICATION

RELATED APPLICATION

This application is a Continuation of U.S. application Ser. No. 16/057,783, filed Aug. 7, 2018, which is a Continuation of U.S. application Ser. No. 15/817,923, filed Nov. 20, 2017 (now U.S. Pat. No. 10,110,598, issued Oct. 23, 2018), which is a Continuation of U.S. application Ser. No. 14/713,765, filed May 15, 2015, which is a Continuation of U.S. application Ser. No. 13/837,062, filed Mar. 15, 2013 (now U.S. Pat. No. 9,038,142, issued May 19, 2015), which claims the benefit of U.S. Provisional Patent Application No. 61/761,202, filed Feb. 5, 2013, the entire content of each of which is incorporated herein by reference.

BACKGROUND

Authorization frameworks and protocols have been developed to enable a third-party application to obtain limited access to a Hyper-Text Transfer Protocol (HTTP) service, either on behalf of a resource owner by orchestrating an approval interaction between the resource owner and the HTTP service, or by allowing the third-party application to obtain access on its own behalf.

In one such framework known as OAuth 2.0, an authorization service accepts requests from a client to access resources controlled by the resource owner and hosted by a resource service. The authorization service issues a set of credentials to the client that is different than that of the resource owner in order to allow the client to access the resources without having access to the resource owner credentials. However, OAuth 2.0 is directed to clients that are offered as network services and are, as a result, able to present extensive user interfaces to the resource owner in response to initiation, by the resource owner, of an authorization flow.

SUMMARY

In one example, the disclosure is directed to a method. The method may include receiving, by a computing device and using short-range wireless communication, an authentication request from a client device. The method may also include receiving, at an input device operably coupled to the computing device, authorization to provide at least one security credential to the client device. The method may further include, responsive to receiving the authorization, sending, by the computing device and to an authentication service, an indication of the authorization.

In another example, the disclosure is directed to a computer-readable storage medium encoded with instructions that, when executed by at least one processor of a computing device, cause the at least one processor to perform operations comprising establishing, by the computing device and with a client device, radio communication for short-range wireless communication. The operations may also comprise receiving, by the computing device and using short-range wireless communication, an authentication request from a client device. The operations may further comprise receiving, by the computing device, authorization to provide at least one security credential to the client device. The operations may also comprise responsive to receiving the authorization, sending, by the computing device and to an authentication service, an indication of the authorization.

In another example, the disclosure is directed to a computing device comprising at least one processor, a short-range wireless communication module operable by the at least one processor to receive, using short-range wireless communication, an authentication request from a client device, and an authorization module operable by the at least one processor to receive authorization to provide at least one security credential to the client device, wherein the authorization module is further configured to, responsive to receiving the authorization, send an indication of the authorization to an authentication service.

In another example, the disclosure is directed to a method comprising sending, by a client device and using short-range wireless communication, an authentication request to a computing device. The method may also comprise receiving, by the client device and responsive to the authentication request, at least one security credential that provides the client device with access to exchange information with a resource service that hosts a protected resource associated with the at least one security credential.

The details of one or more aspects of the disclosure are set forth in the accompanying drawings and the description below. Other features, objects, and advantages of the disclosure will be apparent from the description and drawings, and from the claims.

DETAILED DESCRIPTION

Figure 1:
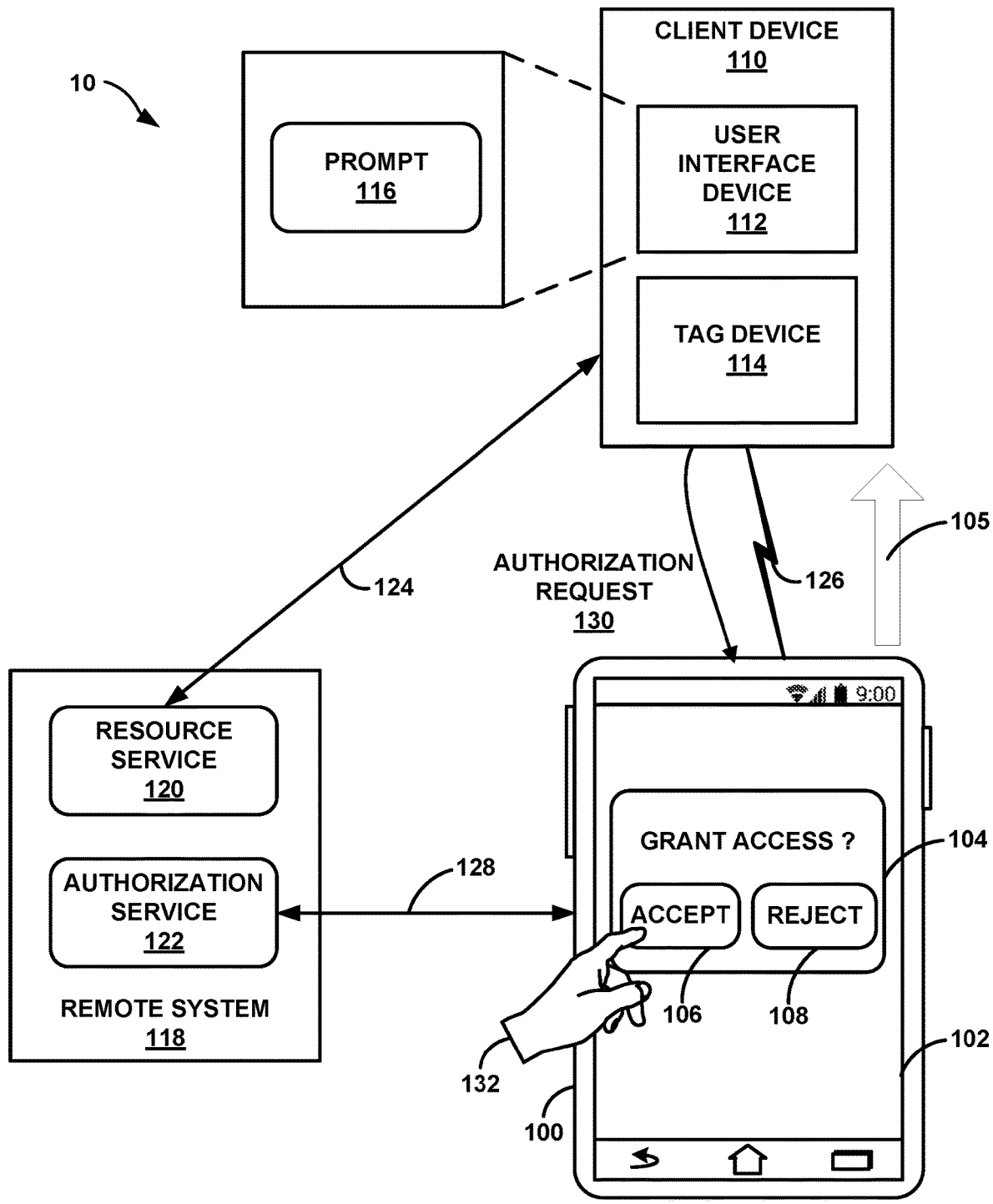
FIG. 1 is a block diagram illustrating an example system having computing devices configured to enable a client device to obtain access to resources according to some aspects of the present disclosure.

In general, aspects of the disclosure are directed towards techniques for initiating an authorization flow with a user to enable a user interface-limited client computing device to obtain access to protected resources hosted by a resource service.

Some client computing devices (hereinafter, "client devices"), such as printers, fax machines, telephones, video-game consoles, television set-top boxes, credit card terminals, automatic teller machines, vending machines, and sales/information kiosks have limited user-interfaces that do not provide expansive input and output devices such as keyboards, whether real or virtual, and web browsers. Some client devices may have such expansive input and output devices, but users may find the user-interfaces unwieldy or otherwise difficult to use outside of a narrow range of activities. In addition, many client devices such as those listed above may be shared among multiple users as part of a shared workspace (e.g., office printers) or may be located in a public area to the public at-large, which exposes the client devices and any data stored thereon, however fleetingly, to hacking. For example, requiring a user to enter security credentials directly into a shared client device may create security problems, such as another person looking over the user's shoulder or even looking at the shared client device display, if the shared client device display displays the security credentials as the user enters that information. Likewise, entering security credentials directly into the shared client device may also introduce unknowns, such as if the security credentials are being stored by the shared client device and, if so, the security employed by the shared client device to protect the stored security credentials from authorized acquisition.

Techniques of this disclosure may, in various aspects, enable a client device to initiate an authorization flow with a user and to send an authorization request for the authorization flow to a mobile computing device of the user when the mobile computing device, such as a mobile phone, is within a defined range of a tag device of the client device. The tag device may be a near-field communication (NFC) tag, for example. The user may engage the client device to perform one or more operations that require access to resources owned by the user but provided by a resource service that requires an indication of user authorization before permitting access to the resources. To initiate the authorization flow, the client device may prompt the user, by a user-interface of the client device, to locate the mobile computing device within the defined range of the tag device in order to engage the tag device. In some aspects, locating the mobile computing device within the defined range of the tag device may include tapping the tag device with the mobile computing device. Once the mobile computing device is located within the defined range of the tag device, the client device may send an authorization request for the authorization flow to the mobile computing device using short-range wireless communication provided by the device tag, and the user may grant authorization to the client device using an input device of the mobile computing device. The authorization flow described herein may conform, at least in part, to OAuth 2.0, which defines an authorization framework to enable third-party applications to obtain limited access to a Hypertext Transfer Protocol (HTTP) service by orchestrating an approval interaction between a resource owner and the HTTP service. However, the techniques are not limited to the OAuth 2.0 authorization framework context.

The mobile computing device may continue the authorization with an authorization service associated with the resource service. The authorization service may generate a security credential, such as an access token, that provides an indication of authorization for the user. The authorization service may provide the access token directly to the client device by a network connection. Alternatively, the mobile computing device may relay the access token from the authorization service to the client device by exchanging the access token with the tag device using short-range wireless communication.

The techniques of this disclosure may provide one or more advantages. For example, despite user interface limitations of the client device, utilizing the mobile computing device to receive and grant an authorization request may enable convenient authorization of the client device to permit access by the client device to user resources provided by a resource service. As another example, because the user of the mobile computing device may authenticate directly with the resource service and authenticate indirectly with the client device using an access token, the user may avoid sending user credentials to a potentially insecure client device. As another example, unless the user revokes access to the client device, the mobile computing device need not request authorization each time the user seeks to use services provided by the client device. Instead, by again engaging the tag device with the mobile computing device, new security credentials may automatically be generated and sent to the client device.

FIG. 1 is a block diagram illustrating an example system having computing devices configured to enable a client device to obtain access to resources according to some aspects of the present disclosure. In the illustrated aspect, computing system 10 includes client device 110 that is configured to initiate an authorization flow with a user of client device 110. Client device 110 may represent printers, fax machines, telephones, video-game consoles, television set-top boxes, credit card terminals, automatic teller machines, vending machines, and sales/information kiosks. A user 132 of computing device 100 may operate client device 110 to use services provided by client device 110, such as printing, scanning, or faxing a document, making a bank withdrawal, purchasing and receiving vended items, and so forth.

Computing system 10 also includes computing device 100, which may represent a mobile computing device, including but not limited to a mobile phone, a tablet computer, a personal digital assistant, a handheld computer, a media player, and the like, including a combination of two or more of these items. Computing device 100 includes display 102, such as a presence-sensitive display, that may receive input and provide output.

Client device 110 includes a user interface device 112 that presents a prompt 116 to the user in order to initiate the authorization flow. User interface device 112 may represent a liquid crystal display (LCD) device, a presence-sensitive display, another visual display device, a light-emitting diode (LED) or other light, a speaker, any other type of device that can generate intelligible output to a user. User interface device 112 may provide limited user interface capabilities. For example, user interface device 112 may provide neither a physical nor virtual keyboard. In addition, user interface device 112 may provide only a limited number of visualizations statically-defined within a configuration of client device 110 and may not provide rendering and input capabilities associated with a web browser, for instance. In some aspects, client device 110 does not provide a web browser.

Prompt 116 may represent words or other glyphs presented by user interface device 112, activation of an LED represented by user interface device 112, or a sound prompt or voice request from a speaker represented by user interface device 112, for instance. Prompt 116 prompts the user of computing device 100 to locate, using motion 105, computing device 100 within the defined range of tag device 114 of client device 110 in order to establish radio communication with (or "engage") tag device 114.

Responsive to prompt 116, the user may, if inclined, locate computing device 100 within the defined range of tag device 114, which causes computing device 100 to engage tag device 114 using communication pathway 126. In some aspects, communication pathway 126 may include a short-range communication pathway, such as near-field communication (NFC), between tag device 114 and computing device 100. Tag device 114 may represent a short-range communication device affixed to or otherwise associated with client device 110 to enable client device 110 to communicate using short-range communication. For example, tag device 114 may represent a near-field communication (NFC) tag, a Bluetooth transceiver, or a Bluetooth low energy transceiver.

Computing device 100 may include a short-range communication module, such as a near-field communication (NFC) module (not shown) capable of short range wireless communication via communication pathway 126 with tag device 114 associated with client device 110 over a short distance. For example, this short distance may be less 100 meters, less than 10 meters, less than 1 meter, less than 10 centimeters, less than 5 centimeters, or even less than 4 centimeters. Although only one tag device 114 is illustrated in the example of FIG. 1, tag device 114 may be representative of any number of tag devices configured to communicate with computing device 100 using a short range communication protocol, such as an NFC protocol. Since each tag device 114 may be relatively simple and configured to communicate with any number of other NFC devices, computing device 100 may be capable of establishing communication with thousands or even millions of different client devices. In some examples, communication pathway 126 may include an NFC network.

Client device 110 is further configured to provide authorization request 130 for the authorization flow to computing device 100 using communication pathway 126. Authorization request 130 represents a request for authorization to exchange information with a service. Authorization request 130 may include an identifier for client device 110, a requested scope for the requested authorization, local state, and/or a redirection Uniform Resource Identifier (URI) to which authorization service 122 may redirect mobile computing device 100 upon granting access to resource service 120. In this aspect, client device 110 sends authorization request 130 directly to computing device 100 by communication pathway 126.

Computing device 100, in response to receiving authorization request 130, may display prompt 104 that provides user 132 of computing device 110 with the option to accept or deny authorization request 130. In the illustrated example, prompt 104 includes accept button 106 and reject button 108, which user 132 may press to accept or reject, respectfully, authorization request 130. Prompt 104 may represent an input interface of an application, executing on computing device 100, that is configured to recognize authorization request 130 as a request for authorization to exchange information with a service. The application may be provided by an entity that manufactures client device 110 or software operating on client device 110. Alternatively, the application may be a utility provided by an entity that manufactures computing device 100 or software operating on computing device 100.

In some aspects, prompt 104 may include an input screen, such as a web page presented by a web browser of computing device 100, to request user 132 to provide resource owner credentials, such as a username and password. The web page may be identified by a URI associated with authorization service 122. For example, the web page may represent a grant access page or authorization endpoint associated with authorization service.

If user 132 rejects authorization request 130, computing device 100 may terminate the authorization flow. If user 132 accepts authorization request 130, computing device 100 continues the authorization flow by granting authorization request 130 in conjunction with authorization service 122. Computing device 100 and authorization service 122 communicate using communication pathway 128, which may represent, for instance, a short-range communication pathways such as Bluetooth or radio-frequency identification (RFID), active NFC communication, wide area networks (WANs), local area networks (LANs), a mobile service provider network (e.g., a 3G or Long-Term Evolution (LTE) network), and the like. Example authorization flows for granting authorization request 130 are described below with respect to FIG. 5.

Authorization service 122 represents a service role for the authorization flow, provided by remote system 118, to authenticate an owner of a protected resource (i.e., a "resource owner") hosted by resource service 120 and to authorize client device 110 to access the protected resource according to a requested scope. Authorization service 122 issues a security credential for use by client device 110 after successfully authenticating user 132 and authorizing client device 110. The security credential provides client device 110 with access to exchange information with resource service 120 that hosts a protected resource associated with the security credential and with user 132. The security credential provided by authorization service 122 may include an access token.

An access token includes data defining a specific scope and, in some aspects, lifetime for an authorized request and may be used by client device 110 to obtain access to protected resources that are hosted by resource service 120 and owned or otherwise associated with user 132. In other words, an access token represents credential to access protected resources and defines a specific scope and, in some aspects, duration of access that is granted by the resource owner and is enforced by authorization service 122 and resource service 120.

An access token may include an identifier usable to retrieve authorization information or may include the authorization information in a secure, verifiable format, e.g., a token string consisting of data and cryptographic signature. Access tokens may, in various aspects, have different formats, structures, and methods of utilization according to resource service 120 security requirements. In some aspects, additional authentication credentials may be needed in order for client device 110 to use an access token. Consequently, an access token may be used in accordance with techniques described herein to replace different authorization credentials (e.g., a username and password combination) with a single token usable to access resource service 120, which enables issuing an access token that is more restrictive than the authorization grant used to obtain the access token, as well as providing a single mechanism for authorization to resource service 120.

Resource service 120 hosts protected resources owned by user 132. The protected resources may include any digital information or hosted resources associated with user 132, such as digital images, digital videos, digital music, eBooks, email accounts, financial information, a cloud storage account, a video game profile, a social network profile, and user preferences, for instance. Resource service 120 may present an application programming interface (API) to provide access to protected resources.

As a result of the authorization flow initiated by client device 110, client device 110 receives an access token, issued by authorization service 122, that corresponds to authorization request 130. Client device 110 uses communication pathway 124 to present the access token to resource service 120 to access protected resources in accordance with the scope of the access token. For example, client device 110 may access and download photos owned by user 132, access a cloud storage account of user 132 to upload digital files such as scanned documents, or otherwise access and use the protected resources associated with user 132. Communication pathway 124 may represent any of the example communication pathways described above with respect to communication path 128.

Upon completing a transaction using the access token, client device 110 may immediately delete the access token, wait for the access token to expire, and/or communicate with user 132 to provide user 132 with an option to delete the access token if desired.

In some aspects, authorization service 122 may issue a refresh token corresponding to authorization request 130. Client device 110 may use the refresh token as a credential to authorization service 122 to obtain a fresh access token when either a current access token corresponding to authorization request 130 becomes invalid or expires or to obtain one or more additional access tokens with additional or narrower scope (e.g., having a shorter lifetime or fewer authorized permissions).

Remote system 118 may include but is not limited to one or more remote servers, one or more computing devices, and/or a cloud computing service. A cloud computing service may include one or more remote servers that may provide one or more services, including but not limited to computation, software, data access, and storage services, without requiring end-user knowledge of the physical location and configuration of the systems that deliver the one or more services. Resource service 120 and authorization service 122 may be hosted by the same or different devices, e.g., servers, of remote system 118. In some aspects, resource service 120 and authorization service 122 may be hosted by different remote systems administered by separate entities.

In some aspects, user 132 may opt-out of third-party authorization features provided by resource service 120. In some aspects, the third-party authorization features provided by resource service 120 are disabled by default and user 132 must opt-in in order to enable these features.

Figure 2A:
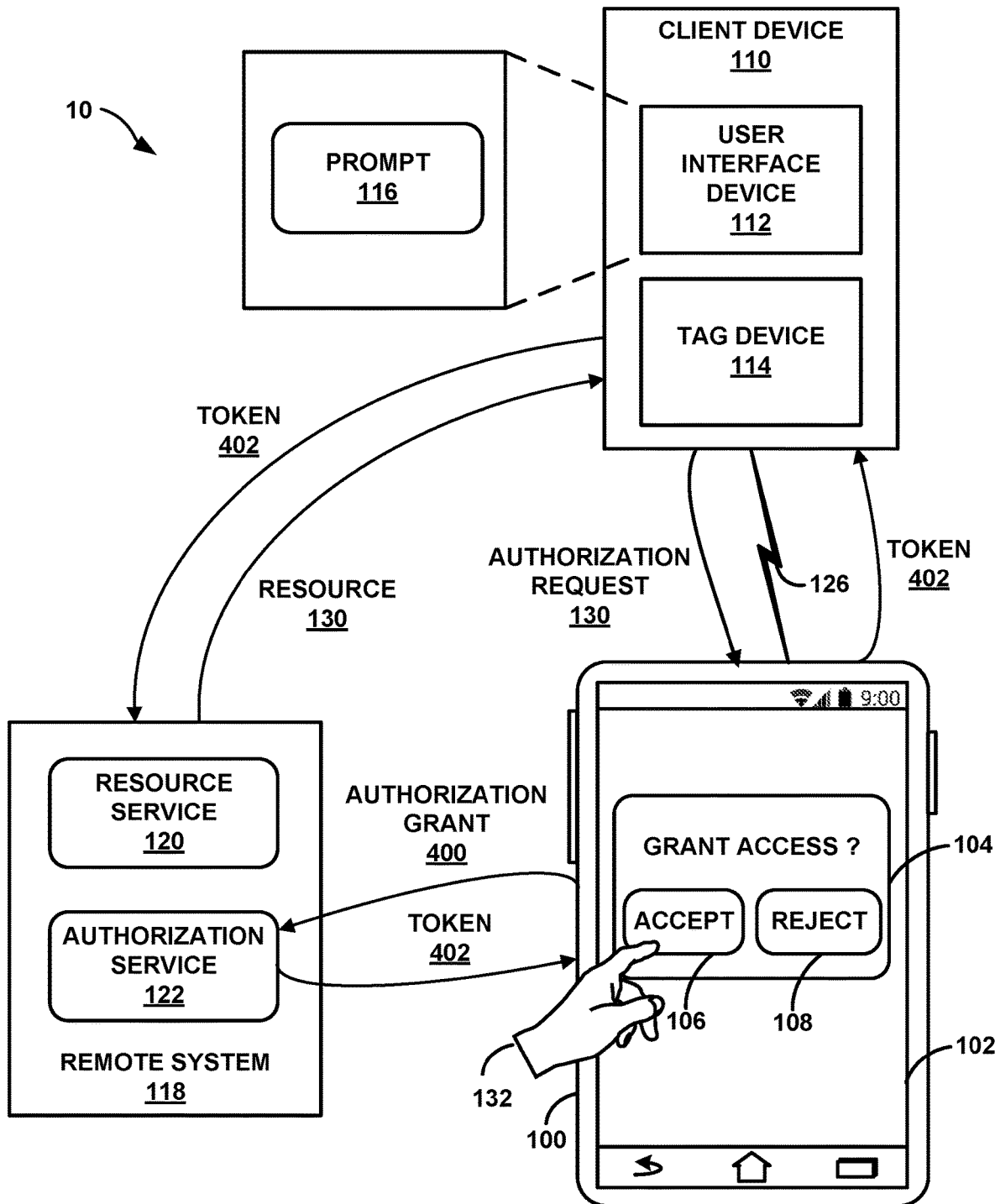
FIGS. 2A-2B depict block diagrams illustrating further details of an example authorization flow initiated by a client device according to techniques described in this disclosure.

FIG. 2A is a block diagram illustrating further details of an example authorization flow initiated by a client device according to techniques described in this disclosure. The example authorization flow is described in the context of computing system 10 of FIG. 1. Communication pathways 124, 128 have been removed to simplify illustration.

In this example, client device 110 is configured to provide authorization request 130 for the authorization flow to computing device 100 using communication pathway 126 to computing device 100. Computing device 100, in response to receiving authorization request 130, may display prompt 104 that provides user 132 of computing device 110 with the option to accept or deny authorization request 130. User 132 accepts authorization request 130, and computing device 100 continues the authorization flow by issuing authorization grant 400, corresponding to authorization request 130, to authorization service 122. Authorization grant 400 may include a credential representing authorization by the resource owner (e.g., user 132) to access protected resources associated with the resource owner. Authorization grant 400 may be usable to obtain an access token. In this sense, authorization grant 400 also represents a request for an access token.

In some aspects, authorization grant 410 may include resource owner credentials of user 132, such as a username and password of user 132. Computing device 100 may store the resource owner credentials to persistent storage and present the resource owner credentials to authorization service 122 in authorization grant 400. In some aspects, authorization service 122 and computing device 100 engage in a separate authentication protocol. For instance, responsive to receiving authorization grant 400, authorization service 122 may send a request for resource owner credentials to computing device 100. In response, computing device 100 may display, using a web browser or other application, a login or other authentication screen by which user 132 may enter and submit his or her resource owner credentials to authorization service 122.

Authorization service 122 authorizes the resource owner credentials and, if the resource owner credentials are valid, issues access token 402 to computing device 100. In this way, computing device 100 stands in for client device 110 during the authorization grant/access token exchange and resource owner credentials of user 132 need not be shared with client device 110.

Computing device 100 receives access token 402 and sends, responsive to authorization request 130, access token 402 to client device 110. Computing device 100 may associate access token 402 with authorization request 130 in a message to client device 110. In some aspects, computing device 100 may, upon receiving token 402 from authorization service 122, prompt user 132 to again locate computing device 100 within a defined range of tag device 114 to send token 402 using communication pathway 126. In some aspects, computing device 100 sends access token 402 to client device 110 by a different communication pathway, such as a LAN.

Client device 110 receives access token 402 and presents token 402 to resource service 120 with a request for a protected resource. Resource service 120 validates access token 402 and, if valid, serves protected resource. In some instances, client device 110 refreshes access token 402 with a refresh token provided by authorization service 122.

Figure 2B:
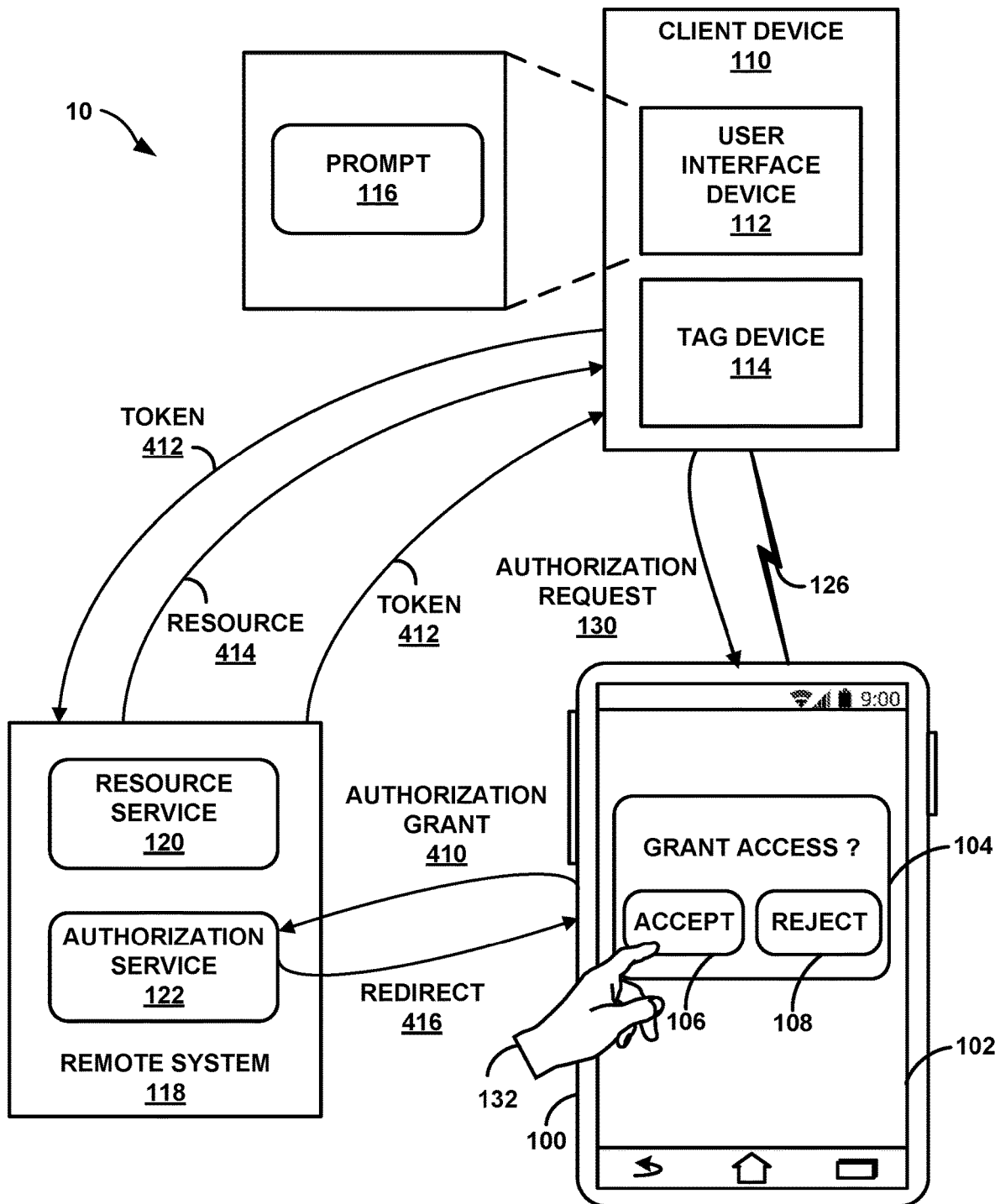

FIG. 2B is a block diagram illustrating further details of an example authorization flow initiated by a client device according to techniques described in this disclosure. The example authorization flow is described in the context of computing system 10 of FIG. 1. Communication pathways 124, 128 have been removed to simplify illustration.

In this example, client device 110 is configured to provide authorization request 130 for the authorization flow to computing device 100 using communication pathway 126 to computing device 100. Computing device 100, in response to receiving authorization request 130, may display prompt 104 that provides user 132 of computing device 110 with the option to accept or deny authorization request 130. User 132 accepts authorization request 130, and computing device 100 continues the authorization flow by issuing authorization grant 410, corresponding to authorization request 130, to authorization service 122. Authorization grant 410 may include a credential representing authorization by the resource owner (e.g., user 132) to access protected resources associated with the resource owner. Authorization grant 410 may be usable to obtain an access token. In this sense, authorization grant 410 also represents a request for an access token.

In some aspects, as described above with respect to FIG. 2A, authorization grant 410 may include resource owner credentials of user 132, such as a username and password. Computing device 100 may store the resource owner credentials to persistent storage and present the resource owner credentials to authorization service 122 in authorization grant 410. In some aspects, authorization service 122 and computing device 100 engage in a separate authentication protocol. For instance, responsive to receiving authorization grant 410, authorization service 122 may send a request for resource owner credentials to computing device 100. In response, computing device 100 may display, using a web browser or other application, a login or other authentication screen by which user 132 may enter and submit his or her resource owner credentials to authorization service 122.

Authorization service 122 authorizes the resource owner credentials and, if the resource owner credentials are valid, issues access token 412 (and optionally a refresh token) directly to client device 110 using communication pathway 124. In this way, computing device 100 stands in for client device 110 during the authorization grant step of the authorization flow, but authorization service 122 sends access token 412 directly to client device 110. As a result, resource owner credentials of user 132 need not be shared with client device 110.

In some aspects, authorization request 130 may include a redirection URI previously provided to client device 110 by authorization service 122. In such aspects, client device 110 may direct computing device 100 to authorization service 122 using the redirection URI. Using resource owner credentials provided in authorization grant 410, authorization service 122 authorizes the resource owner credentials and, if the resource owner credentials are valid, issues access token 412 directly to client device 110 using communication pathway 124. Again, computing device 100 stands in for client device 110 during the authorization grant step of the authorization flow, but authorization service 122 sends access token 412 directly to client device 110. As a result, resource owner credentials of user 132 need not be shared with client device 110. In some instances, prior to and as a prerequisite to issuing access token 412 directly to client device 110, authorization service 122 issues redirect message 416, which includes an authorization code that is associated with access token 412. Computing device 100 provides the authorization code to client device 110, which presents the authorization code to authorization service 122 in order to receive access token 412. Authorization service 122 may additionally authorize client device 110 as a prerequisite to issuing access token 412 (and optionally a refresh token) directly to client device 110.

Figure 3:
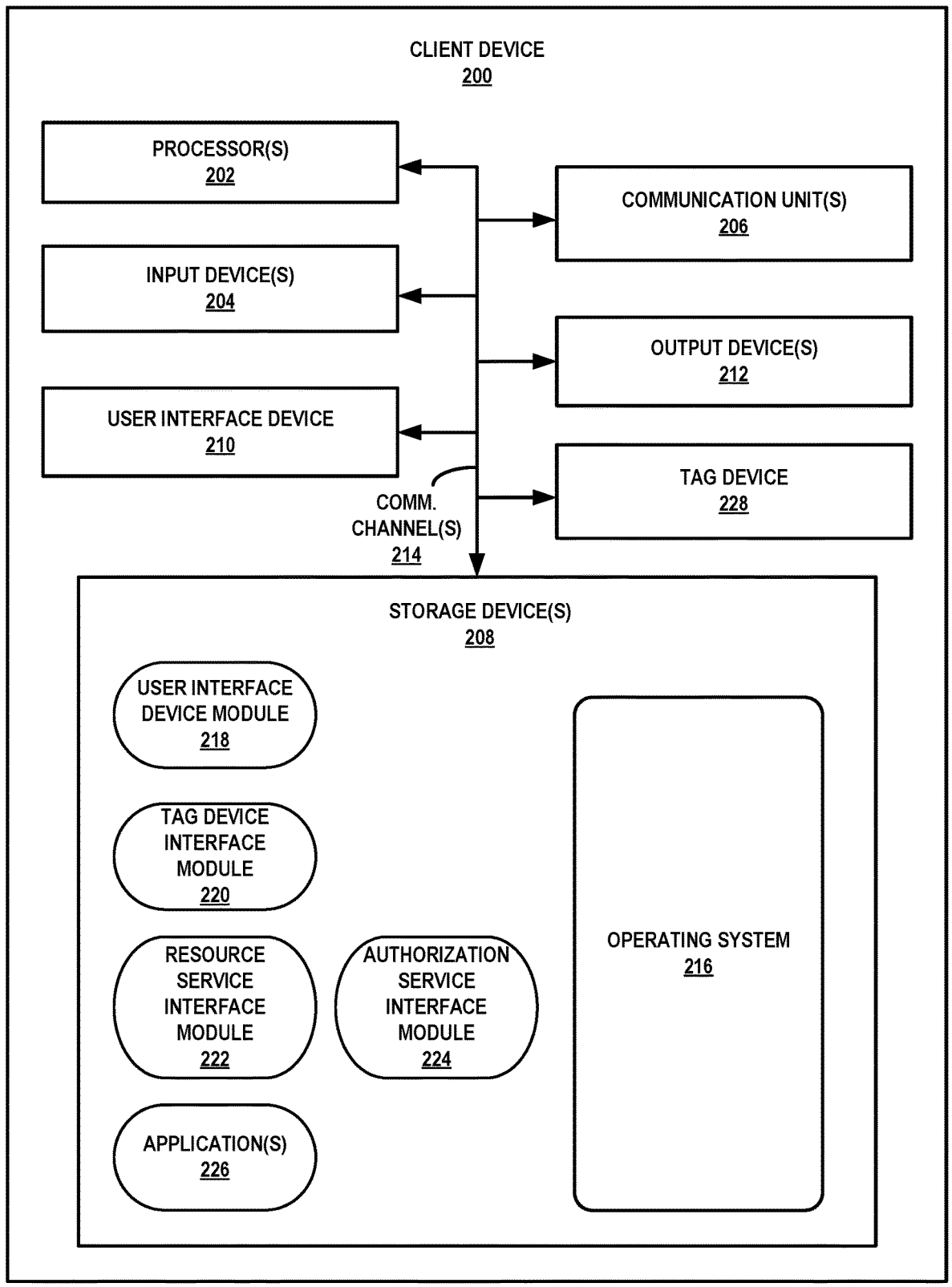
FIG. 3 is a block diagram illustrating further details of one example of a client device configured according to one or more techniques of the present disclosure.

FIG. 3 is a block diagram illustrating further details of one example of a client device shown in FIGS. 1, 2A, and 2B, in accordance with one or more techniques of the present disclosure. FIG. 3 illustrates only one particular example of client device 110, and other examples of client device 110 may be used in other instances. Although shown in FIG. 3 as a stand-alone client device 200 for purposes of example, a client device may be any component or system that includes one or more processors or other suitable computing environment for executing software instructions and, for example, need not necessarily include one or more elements shown in FIG. 3.

As shown in the specific example of FIG. 3, client device 200 includes one or more processors 202, one or more input devices 204, one or more communication units 206, one or more output devices 212, one or more storage devices 208, user interface (UI) device 210, and tag device 228. Client device 200, in one example, further includes UI device module 218, tag device interface module 220, resource service interface module, authorization service interface module 224, one or more applications 226, and operating system 216 that are executable by computing device 300. Each of components 202, 204, 206, 208, 210, 212, and 226 are coupled (physically, communicatively, and/or operatively) for inter-component communications. In some examples, communication channels 214 may include a system bus, a network connection, an inter-process communication data structure, or any other method for communicating data. As one example in FIGS. 3, 202, 204, 206, 208, 210, 212, and 226 may be coupled by one or more communication channels 214. User interface device module 218, tag device interface module 220, resource service interface module 222, authorization service interface module 224, and the one or more applications 226 may also communicate information with one another as well. While illustrated as separate modules, any one or more of modules 218, 220, 222, and 224 may be implemented as part of any of applications 226.

Processors 202, in one example, are configured to implement functionality and/or process instructions for execution within client device 200. For example, processors 202 may be capable of processing instructions stored in one or more storage devices 208. Examples of processors 202 may include, any one or more of a microprocessor, a controller, a digital signal processor (DSP), an application specific integrated circuit (ASIC), a field-programmable gate array (FPGA), or equivalent discrete or integrated logic circuitry.

One or more storage devices 208 may be configured to store information within client device 200 during operation. Storage device 208, in some examples, is described as a computer-readable storage medium. In some examples, storage device 208 is a temporary memory, meaning that a primary purpose of storage device 208 is not long-term storage. Storage device 208, in some examples, is described as a volatile memory, meaning that storage device 208 does not maintain stored contents when the computer is turned off. Examples of volatile memories include random access memories (RAM), dynamic random access memories (DRAM), static random access memories (SRAM), and other forms of volatile memories known in the art. In some examples, storage device 208 is used to store program instructions for execution by processors 202. Storage device 208, in some examples, is used by software or applications running on client device 200 to temporarily store information during program execution.

Storage devices 208, in some examples, also include one or more computer-readable storage media. Storage devices 208 may be configured to store larger amounts of information than volatile memory. Storage devices 208 may further be configured for long-term storage of information. In some examples, storage devices 208 include non-volatile storage elements. Examples of such non-volatile storage elements include magnetic hard discs, optical discs, floppy discs, flash memories, or forms of electrically programmable memories (EPROM) or electrically erasable and programmable (EEPROM) memories.

Client device 200, in some examples, also includes one or more communication units 206. Client device 200, in one example, utilizes communication unit 206 to communicate with external devices via one or more networks, such as one or more wireless networks. Communication unit 206 may be a network interface card, such as an Ethernet card, an optical transceiver, a radio frequency transceiver, or any other type of device that can send and receive information. Other examples of such network interfaces may include Bluetooth, 3G and WiFi radios computing devices as well as Universal Serial Bus (USB). In some examples, client device 200 utilizes communication unit 206 to wirelessly communicate with an external device such as a server (e.g., remote system 118 of FIGS. 1, 2A, and 2B).

In addition, the client device 200 may include tag device 228 for short-range wireless communication. As described herein, tag device 228 may be active hardware that is configured to communicate with other short-range communication devices. In general, tag device 228 may be configured to communicate wirelessly with other devices in physical proximity to tag device 228 (e.g., less than approximately ten centimeters, or less than approximately four centimeters). In some examples, tag device 228 may include a near-field communication (NFC) device that communicates via NFC. In other examples tag device 228 may be replaced with an alternative short-range communication device configured to communicate with and receive data from other short range communication sensors. These alternative short-range communication devices may operate according to Bluetooth, Bluetooth Low Energy, Ultra-Wideband radio, or other short-range wireless communication protocols. In some examples, tag device 228 may be an external hardware device that is coupled with client device 200 via a bus (such as via a Universal Serial Bus (USB) port). Tag device 228, in some examples, may also include software which may, in some examples, be independent from operating system 216, and which may, in some other examples, be a sub-routine of operating system 216 or more specifically of tag device interface module 220. In some examples, tag device interface module 220 may provide an interface to send and receive short-range wireless communications using tag device 228 to, e.g., initiate an authorization flow with a computing device and/or to receive an access token from a computing device.

Client device 200 may also include one or more input devices 204. Input device 204 is configured to receive input. Examples of input device 304 include a scanner, a fax machine, and an infrared interface.

One or more output devices 212 may also be included in client device 200. Output device 212, in some examples, is configured to provide output to a user using tactile, audio, or video stimuli. Output device 212, in one example, includes a presence-sensitive display, a sound card, a video graphics adapter card, or any other type of device for converting a signal into an appropriate form understandable to humans or machines. Additional examples of output device 212 include a speaker, a cathode ray tube (CRT) monitor, a liquid crystal display (LCD), or any other type of device that can generate intelligible output to a user.

In some examples, UI device 210 may include functionality of input device 204 and/or output device 212. UI device 212 may be a presence-sensitive display. User interface device 212 may provide limited user interface capabilities. For example, user interface device 212 may provide neither a physical nor virtual keyboard. In addition, user interface device 212 may provide only a limited number of visualizations statically-defined within a configuration of client device 200 and may not provide rendering and input capabilities associated with a web browser, for instance. In some aspects, client device 200 does not provide a web browser for interfacing with a user. User interface device module 218 may control, at least in part, the operations of user interface device 210 and interface user interface device 210 to, e.g., application 226.

Client device 200 may include operating system 216. Operating system 216, in some examples and at least in part, controls the operation of components of client device 200. For example, operating system 216, in one example, facilitates the communication of user interface device module 218 with processors 202, communication unit 206, storage device 208, input device 204, user interface device 210, tag device 228, and output device 212.

In some examples, resource service interface module 222 provides an application programming interface to application 226 for interfacing with a resource service, such as resource service 120 of FIGS. 1, 2A, and 2B. In some examples, authorization service interface module 224 provides an application programming interface to application 226 for interfacing with an authorization service, such as resource service 122 of FIGS. 1, 2A, and 2B.

UI device module 218, tag device interface module 220, resource service interface module 222, authorization service interface module 224, and one or more applications 226 may include program instructions and/or data that are executable by client device 200. As one example, each of components 218, 220, 222, 224, and 226 may include instructions that cause client device 200 to perform one or more of the operations and actions described in the present disclosure.

Figure 4:
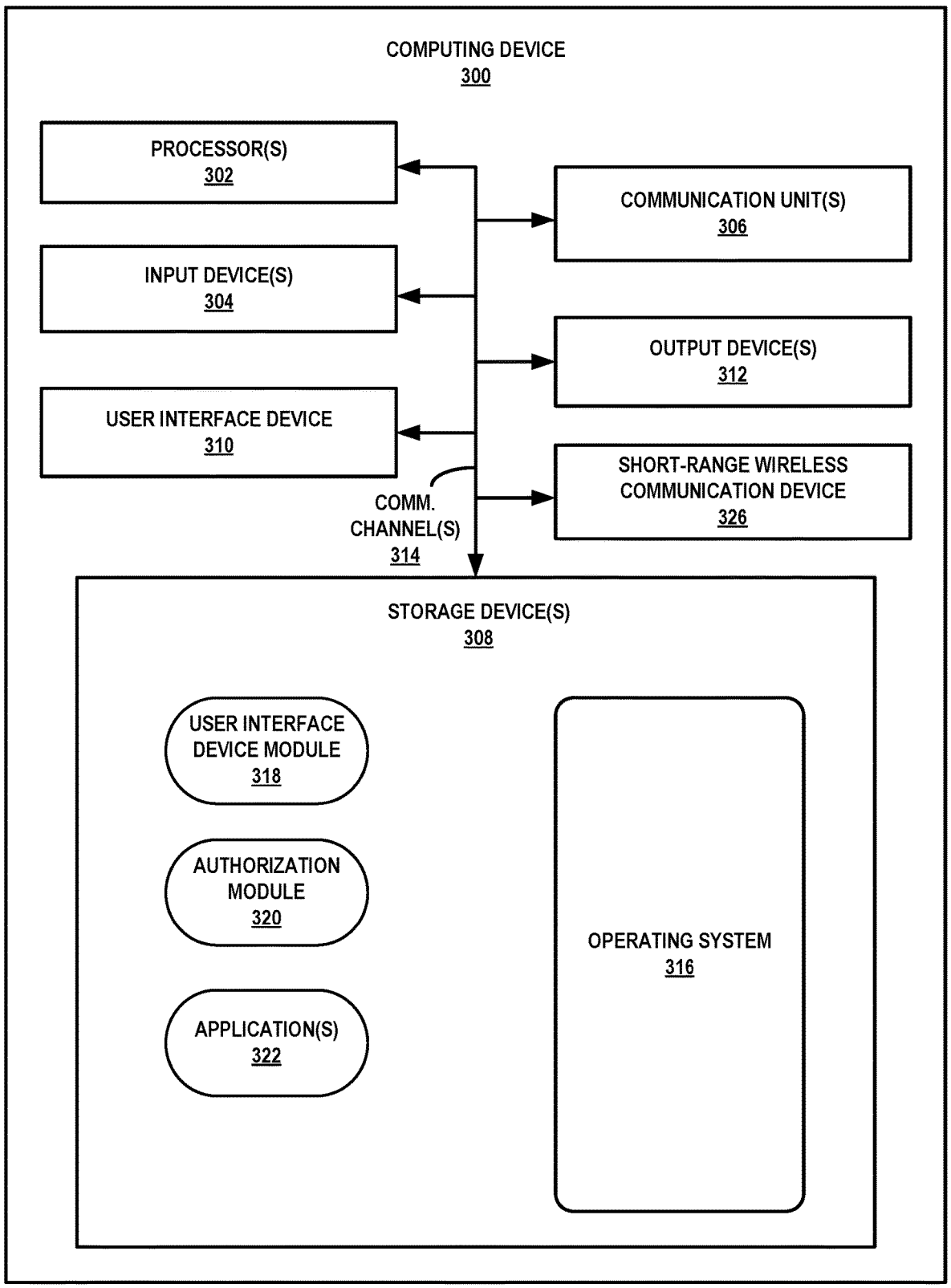
FIG. 4 is a block diagram illustrating further details of one example of a computing device configured according to one or more techniques of the present disclosure

FIG. 4 is a block diagram illustrating further details of one example of a computing device shown in FIGS. 1, 2A, and 2B, in accordance with one or more techniques of the present disclosure. FIG. 4 illustrates only one particular example of computing device 100, and other examples of computing device 100 may be used in other instances. Although shown in FIG. 4 as a stand-alone computing device 300 for purposes of example, a computing device may be any component or system that includes one or more processors or other suitable computing environment for executing software instructions and, for example, need not necessarily include one or more elements shown in FIG. 4 (e.g., input devices 304, user interface devices 310, output devices 312).

As shown in the specific example of FIG. 4, computing device 300 includes one or more processors 302, one or more input devices 304, one or more communication units 306, one or more output devices 312, one or more storage devices 308, and user interface (UI) device 310, and short-range wireless communication device 236. Computing device 300, in one example, further includes UI device module 318, authorization module 320, one or more applications 322, and operating system 316 that are executable by computing device 300. Each of components 302, 304, 306, 308, 310, 312, and 326 are coupled (physically, communicatively, and/or operatively) for inter-component communications. In some examples, communication channels 314 may include a system bus, a network connection, an inter-process communication data structure, or any other method for communicating data. As one example in FIG. 4, components 302, 304, 306, 308, 310, 312, and 326 may be coupled by one or more communication channels 314. UI device module 318, authorization module 320, and one or more applications 322 may also communicate information with one another as well as with other components in computing device 300. While illustrated as separate modules, any one or more of modules 318 or 320 may be implemented as part of any of applications 322.

Processors 302, in one example, are configured to implement functionality and/or process instructions for execution within computing device 300. For example, processors 302 may be capable of processing instructions stored in storage device 308. Examples of processors 302 may include, any one or more of a microprocessor, a controller, a digital signal processor (DSP), an application specific integrated circuit (ASIC), a field-programmable gate array (FPGA), or equivalent discrete or integrated logic circuitry.

One or more storage devices 308 may be configured to store information within computing device 300 during operation. Storage device 308, in some examples, is described as a computer-readable storage medium. In some examples, storage device 308 is a temporary memory, meaning that a primary purpose of storage device 308 is not long-term storage. Storage device 308, in some examples, is described as a volatile memory, meaning that storage device 308 does not maintain stored contents when the computer is turned off. Examples of volatile memories include random access memories (RAM), dynamic random access memories (DRAM), static random access memories (SRAM), and other forms of volatile memories known in the art. In some examples, storage device 308 is used to store program instructions for execution by processors 302. Storage device 308, in one example, is used by software or applications running on computing device 300 to temporarily store information during program execution.

Storage devices 308, in some examples, also include one or more computer-readable storage media. Storage devices 308 may be configured to store larger amounts of information than volatile memory. Storage devices 308 may further be configured for long-term storage of information. In some examples, storage devices 308 include non-volatile storage elements. Examples of such non-volatile storage elements include magnetic hard discs, optical discs, floppy discs, flash memories, or forms of electrically programmable memories (EPROM) or electrically erasable and programmable (EEPROM) memories.

Computing device 300, in some examples, also includes one or more communication units 306. Computing device 300, in one example, utilizes communication unit 306 to communicate with external devices via one or more networks, such as one or more wireless networks. Communication unit 306 may be a network interface card, such as an Ethernet card, an optical transceiver, a radio frequency transceiver, or any other type of device that can send and receive information. Other examples of such network interfaces may include Bluetooth, 3G and WiFi radios computing devices as well as Universal Serial Bus (USB). In some examples, computing device 300 utilizes communication unit 306 to wirelessly communicate with an external device such as a server (e.g., remote system 118 of FIGS. 1, 2A, and 2B).

In addition, the computing device 300 may include short-range wireless communication module 326. As described herein, short-range wireless communication module 326 may be active hardware that is configured to communicate with other short-range communication devices. In general, short-range wireless communication module 326 may be configured to communicate wirelessly with other devices in physical proximity to short-range wireless communication module 326 (e.g., less than approximately ten centimeters, or less than approximately four centimeters), such as tag device 114 of FIGS. 1, 2A, and 2B. In some examples, short-range communication module 326 may include a near-field communication (NFC) module that communicates via NFC. In other examples short-range wireless communication module 326 may be replaced with an alternative short-range communication device configured to communicate with and receive data from other short range communication sensors. These alternative short-range communication devices may operate according to Bluetooth, Ultra-Wideband radio, or other similar protocols. In some examples, short-range wireless communication module 326 may be an external hardware module that is coupled with computing device 300 via a bus (such as via a Universal Serial Bus (USB) port). Short-range wireless communication module 326, in some examples, may also include software which may, in some examples, be independent from operating system 316, and which may, in some other examples, be a sub-routine of operating system 316.

Computing device 300, in one example, also includes one or more input devices 304. Input device 304, in some examples, is configured to receive input from a user through tactile, audio, or video feedback. Examples of input device 304 include a presence-sensitive display, a mouse, a keyboard, a voice responsive system, video camera, microphone or any other type of device for detecting a command from a user. In some examples, a presence-sensitive display includes a touch-sensitive screen.

One or more output devices 312 may also be included in computing device 300. Output device 312, in some examples, is configured to provide output to a user using tactile, audio, or video stimuli. Output device 312, in one example, includes a presence-sensitive display, a sound card, a video graphics adapter card, or any other type of device for converting a signal into an appropriate form understandable to humans or machines. Additional examples of output device 312 include a speaker, a cathode ray tube (CRT) monitor, a liquid crystal display (LCD), or any other type of device that can generate intelligible output to a user. In some examples, user interface (UI) device 310 may include functionality of input device 304 and/or output device 312. In the example of FIGS. 1, 2A, and 2B, UI device 312 may be a presence-sensitive display.

Computing device 300 may include operating system 316. Operating system 316, in some examples, controls the operation of components of computing device 300. For example, operating system 316, in one example, facilitates the communication of user interface device module 318, authorization module 320, and application 322 with processors 302, communication unit 306, storage device 308, input device 304, user interface device 310, short-range wireless communication module 326, and output device 312. UI module 318, authorization module 320, and application 322 may also include program instructions and/or data that are executable by computing device 300. As one example, modules 318, 320, and 322 may include instructions that cause computing device 300 to perform one or more of the operations and actions described in the present disclosure. For instance, application 322 may cause computing device 300 to receive, by short-range wireless communication and from a client device, a request to authorize an authorization flow and to send a corresponding authorization grant to an authorization service. In addition, application 322 may relay an access token received from the authorization service to the client device by short-range wireless communication.

User interface device module 318 may display a prompt at user interface device 310, such as a presence-sensitive screen, in response to an authorization request received by short-range wireless communication device 326 and initiated by a client device. The prompt may provide the option to grant or reject the authorization request. If a user grants the authorization request, authorization module 320 may interface with an authorization service, such as authorization service 122 of FIGS. 1, 2A, and 2B, to authenticate the user and to authorize the client to access resources owned by the user and served by a resource service. Any of user interface module 318, authorization module 320, and application 322 may represent a web browser or web browser module.

Figure 5A:
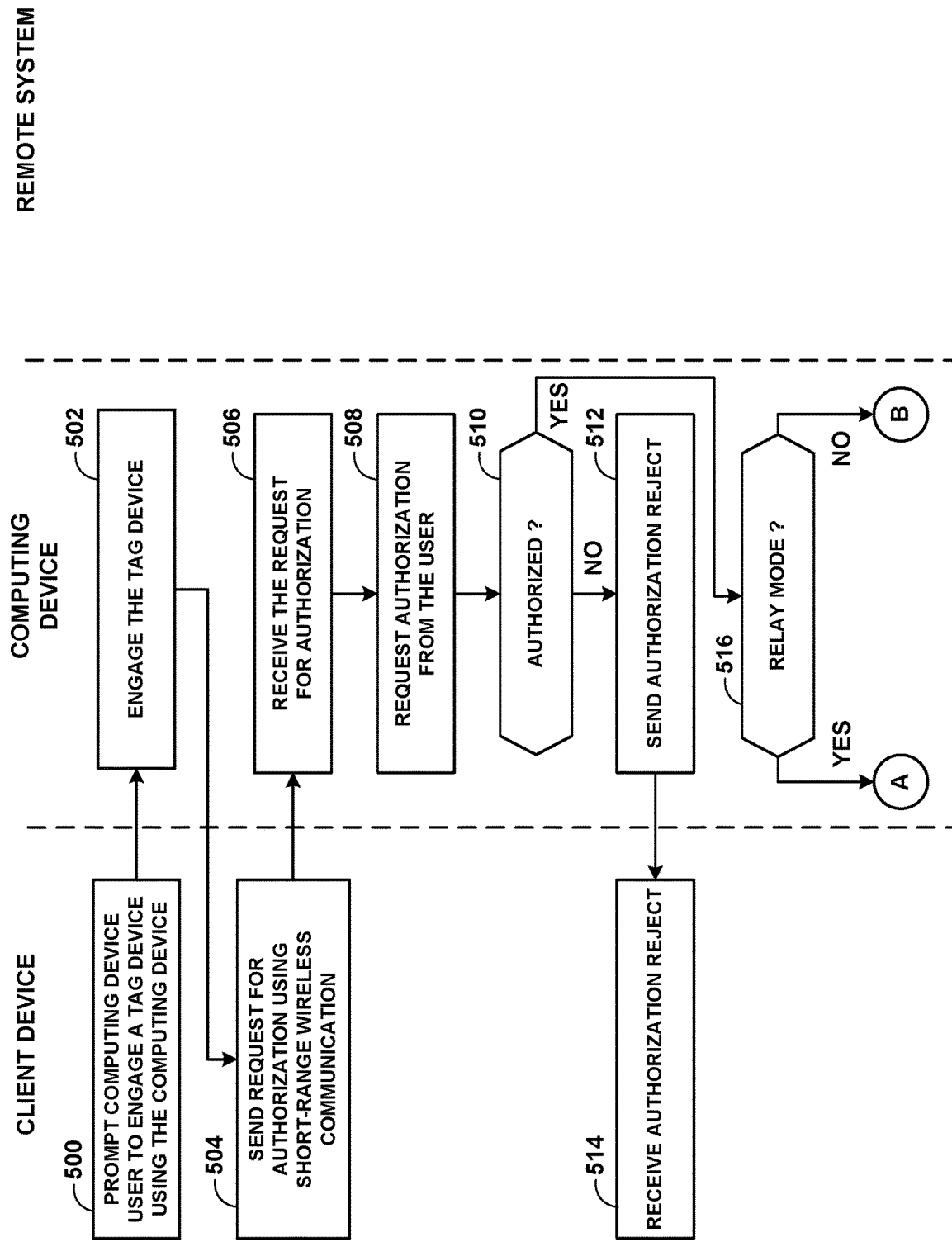
FIGS. 5A-5C depict a flow chart illustrating an example process that may be performed by a computing system to authorize a client device to access resources owned by a user and served by a resource service, according to techniques of the present disclosure.
Figure 5B:
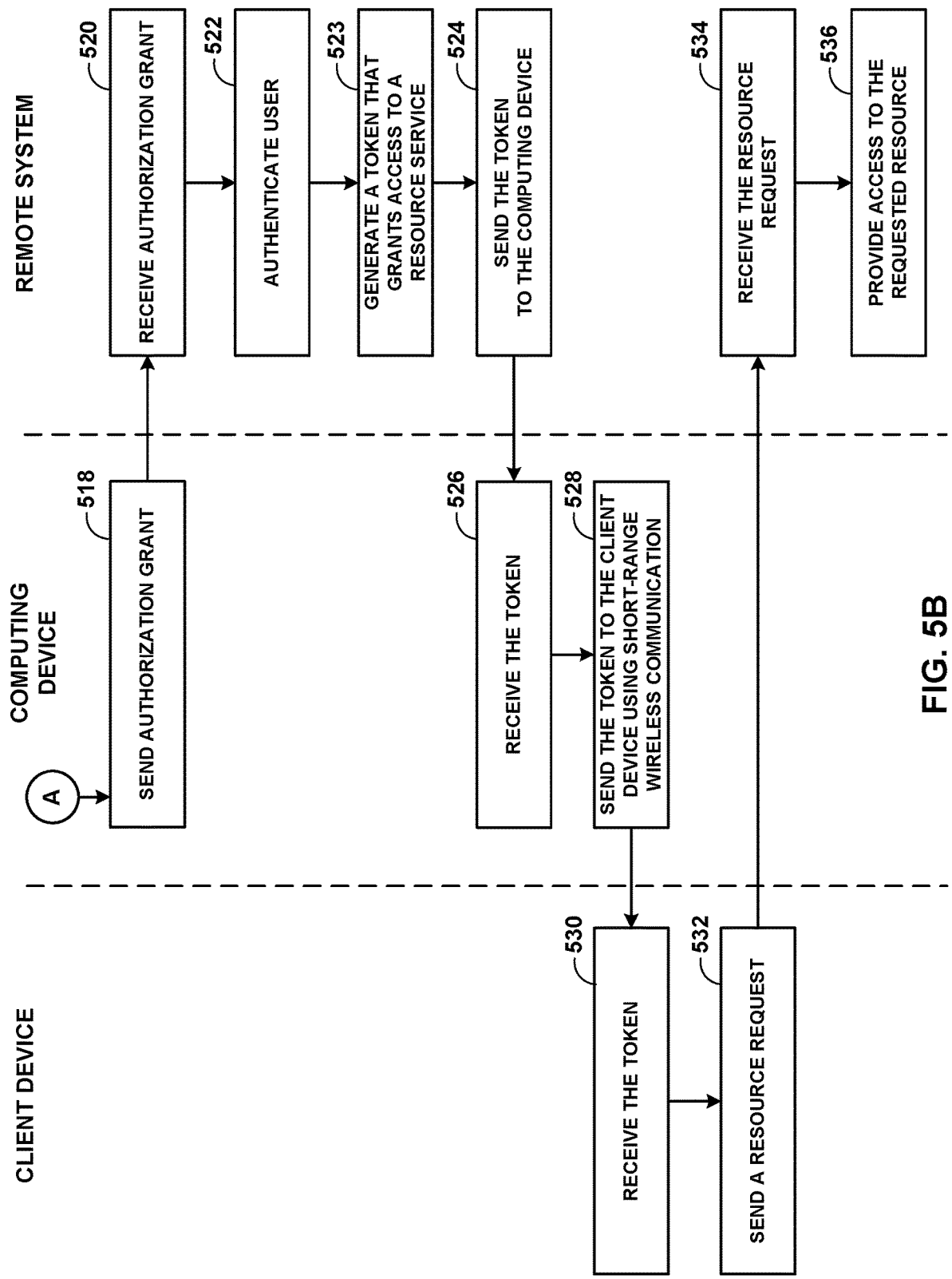
Figure 5C:
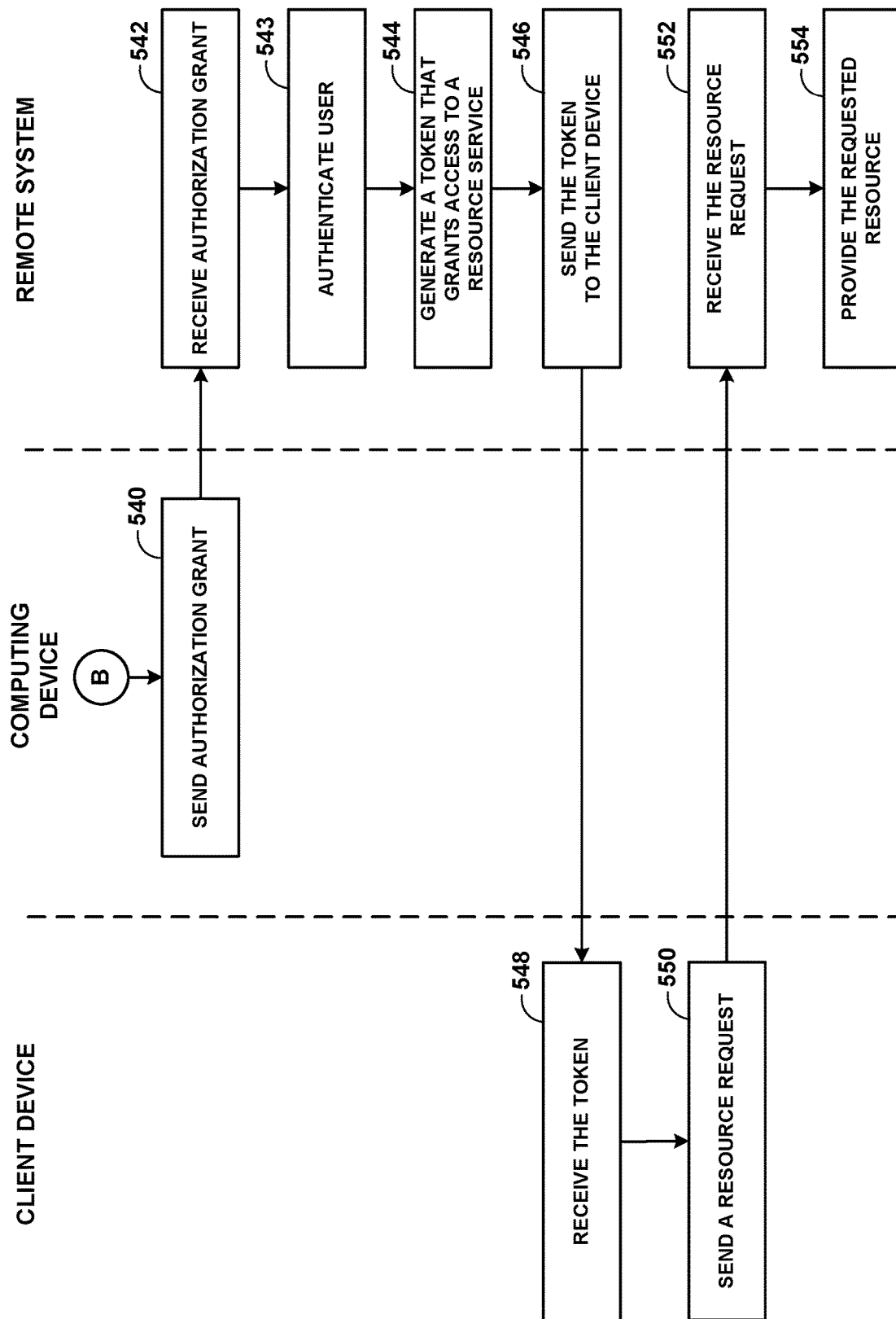

FIGS. 5A-5C depict a flow chart illustrating an example process that may be performed by a computing system to authorize a client device to access resources owned by a user and served by a resource service, according to techniques of the present disclosure. The process includes invoking a prompt 116, by a client device 110, to prompt user 132 of computing device 100 to engage tag device 114 using computing device 100 (500). User 132 may locate computing device 100 within a defined range of tag device 114, which causes computing device 100 to engage tag device 114 (502). Upon tag device 114 of client device 110 detecting computing device 100 within the defined range, client device 110 sends authorization request 130 to computing device 100 using short-range wireless communication provided by tag device 114 by communication path 126 (504).

Computing device 100 receives authorization request 130 (506) and displays prompt 104 to request authorization by user 132 to proceed with the authorization for client device 110 (508). If user 132 fails to authorize (NO branch of 510), computing device 100 may send an authorization reject message to client device 100 (512), which receives the authorization reject message (514). If user 132 accepts and authorizes computing device 100 to proceed (YES branch of 510), the process may proceed according to relay mode or direct mode (516).

In general, in accordance with relay mode (YES branch of 516), computing device 100 relays an access token 402 to client device 110. More specifically, in the example process illustrated by FIG. 5B, computing device 100 sends authorization grant 400 to an authorization service 122 of remote system 118 (518). Authorization grant 400 may include resource owner credentials for user 132. Authorization service 122 receives authorization grant 400 (520) and, in some instances, authenticates user 132 (522). In addition, authorization service 122 provides authorization corresponding to authorization request 130 by generating access token 402 that grants access to a requested resource hosted by resource service 120 (523). Authorization service 122 sends access token 402 to computing device 100 (524), which receives access token 402 (526) and sends access token 402 to client device 110 using short-range wireless communication by communication pathway 126 (528). Client device 110 receives access token 402 (530).

Client device 110 may include access token 402 in a resource request to resource service 120 of remote system 118 (532). Remote system 118 receives the resource request (534). Upon validating access token 402, remote system 118 provides access to client device 110 to the requested resource (536).

In general, in accordance with direct mode (NO branch of 516), authorization service 122 sends an access token 412 directly to client device 110. More specifically, in the example process illustrated by FIG. 5C, computing device 100 sends authorization grant 410 to an authorization service 122 of remote system 118 (540). Authorization grant 412 may include resource owner credentials for user 132. Authorization service 122 receives authorization grant 400 (542) and, in some instances, authenticates user 132 (543). In addition, authorization service 122 provides authorization corresponding to authorization request 130 by generating access token 412 that grants access to a requested resource hosted by resource service 120 (544). Authorization service 122 sends access token 412 directly to client device 110 by communication pathway 124 (546). Client device 110 receives access token 402 (548).

Client device 110 may include access token 412 in a resource request to resource service 120 of remote system 118 (550). Remote system 118 receives the resource request (552). Upon validating access token 412, remote system 118 provides access to client device 110 to the requested resource (554).

Figure 6:
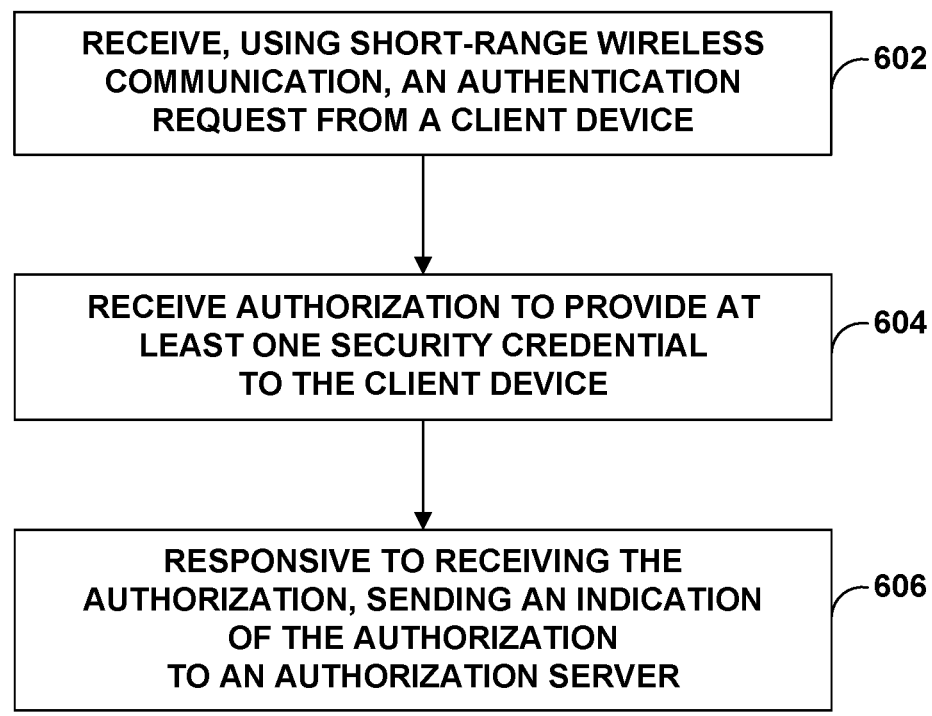
FIG. 6 is a flow chart illustrating an example process that may be performed by a computing system to authorize a client device to access resources owned by a user and served by a resource service, according to techniques of the present disclosure.

FIG. 6 is a flow chart illustrating an example process that may be performed by a computing system to authorize a client device to access resources owned by a user and served by a resource service, according to techniques of the present disclosure. The process includes receiving, by computing device 100 and using short-range wireless communication, an authentication request 130 from client device 110 (602). Computing device 100 receives, at an input device operably coupled to computing device 100, such as display 102, authorization to provide a security credential to client device 110 (604). In response to receiving the authorization, computing device 100 sends an indication of the authorization, such as authorization grant 400 of FIG. 2A or authorization grant 410 of FIG. 2B, to authorization service 122 (606).

The techniques described in this disclosure may be implemented, at least in part, in hardware, software, firmware, or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit including hardware may also perform one or more of the techniques of this disclosure.

Such hardware, software, and firmware may be implemented within the same device or within separate devices to support the various techniques described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware, firmware, or software components. Rather, functionality associated with one or more modules or units may be performed by separate hardware, firmware, or software components, or integrated within common or separate hardware, firmware, or software components.

The techniques described in this disclosure may also be embodied or encoded in an article of manufacture including a computer-readable storage medium encoded with instructions. Instructions embedded or encoded in an article of manufacture including a computer-readable storage medium encoded, may cause one or more programmable processors, or other processors, to implement one or more of the techniques described herein, such as when instructions included or encoded in the computer-readable storage medium are executed by the one or more processors. Computer readable storage media may include random access memory (RAM), read only memory (ROM), programmable read only memory (PROM), erasable programmable read only memory (EPROM), electronically erasable programmable read only memory (EEPROM), flash memory, a hard disk, a compact disc ROM (CD-ROM), a floppy disk, a cassette, magnetic media, optical media, or other computer readable storage media.

In some examples, a computer-readable storage medium may comprise non-transitory medium. The term "non-transitory" may indicate that the storage medium is not embodied in a carrier wave or a propagated signal. In certain examples, a non-transitory storage medium may store data that can, over time, change (e.g., in RAM or cache).

Various examples of the disclosure have been described. These and other examples are within the scope of the following claims.

What is claimed is:

1. A method comprising:
outputting, by a client device, a prompt to initiate an authorization flow;
executing, by a computing device including a display, an application provided by an entity that also provides the client device;
receiving, by the computing device and via the application, a request to permit the client device to access a resource service that hosts digital information including one or more of digital images, digital videos, digital music, digital photos, or eBooks;
receiving, by the computing device, redirect information associated with the resource service;
responsive to receiving the redirect information associated with the resource service, causing to be displayed via the display of the computing device, using the redirect information, a prompt that requests authorization for access to the resource service;
after causing the prompt to be displayed via the display of the computing device, receiving, by the client device and from an authorization service of the resource service, at least one access token that provides access to the digital information hosted by the resource service, wherein the client device does not provide a physical or virtual keyboard enabling a user to directly enter the username and password for the resource service at the client device;
sending, by the client device and to the resource service, the at least one access token as part of an invocation of an application programming interface provided by the resource service; and
responsive to sending the at least one access token to the resource service, receiving, by the client device and from the resource service, access to the digital information hosted by the resource service, wherein the client device receives the at least one access token from the authorization service without the computing device relaying the token between the authorization service and the client device.

2. The method of claim 1, wherein:
the digital information includes a subset of a plurality of protected resources hosted by the resource service, and
the at least one access token specifies a duration for which access to the digital information is granted and identifies the subset of the plurality of protected resources to which the client device is granted access.

3. The method of claim 1, further comprising:
after receiving access to the digital information hosted by the resource service, receiving, by the client device, at least a portion of the digital information hosted by the resource service.

4. The method of claim 1, wherein the at least one access token is a token the enables the client device to access to the digital information without requiring further resource owner credentials.

5. The method of claim 1, wherein the at least one access token is a token that includes a string of data and a cryptographic signature.

6. The method of claim 1, further comprising, after sending the at least one access token to the resource service:
receiving, by the client device and from the authorization service, a refresh token, wherein the refresh token modifies the access to the digital information enabled by the at least one access token.

7. The method of claim 1, further comprising:
revoking access to the digital information by the client device.

8. The method of claim 1, further comprising:
displaying, by the computing device and via the application, an option to delete the at least one access token.

9. The method of claim 1, further comprising:
sending, by the client device and to the authorization service, a refresh token;
responsive to sending the refresh token, receiving, by the client device and from the authorization service, a second access token to replace the at least one access token when the at least one access token has expired;
sending, by the client device and to the resource service, the second access token as part of another invocation of the application programming interface hosted by the resource service; and
responsive to sending the second access token to the resource service, receiving, by the client device and from the resource service, access to the digital information hosted by the resource service.

10. The method of claim 1, wherein the digital information includes the digital videos, the method further comprising:
responsive to sending the at least one access token to the resource service, receiving, by the client device and from the resource service, access to the digital videos hosted by the resource service.

11. A system comprising:
a client device; and
a computing device comprising:
at least one processor;
a communication unit;
a display device; and
a storage device that stores one or more modules and an application provided by an entity that also provides the client device, wherein the application is executable by the at least one processor of the computing device and the one or more modules are executable by the at least one processor of the computing device to:
receive, via the application, a request to permit the client device to access a resource service that hosts digital information including one or more of digital images, digital videos, digital music, digital photos, or eBooks;
receive a redirect information associated with the resource service;
responsive to receiving the redirect information associated with the resource service, cause to be displayed via the display of the computing device, using the redirect information, a prompt that requests authorization for access to the resource service; and
after causing the prompt to be displayed via the display of the computing device, receive, from an authorization service of the resource service, at least one access token that provides access to the digital information hosted by the resource service, wherein the client device does not provide a physical or virtual keyboard enabling a user to directly enter the username and password for the resource service at the client device;
wherein the client device comprises:
at least one processor;

a communication unit; and a storage device that stores one or more modules executable by the at least one processor of the client device to:
- output a prompt to initiate an authorization flow;
- send, to the resource service via the communication unit, the at least one access token as part of an invocation of an application programming interface provided by the resource service; and
- responsive to sending the at least one access token to the resource service, receive, from the resource service, access to the digital information hosted by the resource service, wherein the client device receives the at least one access token from the authorization service without the computing device relaying the token between the authorization service and the client device.

12. The system of claim 11, wherein:
the digital information includes a subset of a plurality of protected resources hosted by the resource service, and
the at least one access token specifies a duration for which access to the digital information is granted and identifies the subset of the plurality of protected resources to which the client device is granted access.

13. The system of claim 11,
wherein the one or more modules of the client device are further operable by the at least one processor of the client device to access at least a portion of the digital information hosted by the resource service.

14. The system of claim 11, wherein the access token is a token the enables the client device to access to the digital information without requiring further resource owner credentials.

15. The system of claim 11, wherein the access token is a token that includes a string of data and a cryptographic signature.

16. The system of claim 11, wherein the one or more modules of the client device are further operable by the at least one processor of the client device to:
after sending the access token to the resource service, receive, from the authorization service, a refresh token,
wherein the refresh token modifies the access to the digital information enabled by the access token.

17. The system of claim 11, wherein the one or more modules stored at the storage device of the computing device are further executable by the at least one processor of the computing device to send a request for access to the resource service, wherein the request for access includes an identifier for the client device.

18. The system of claim 11, wherein the one or more modules stored at the storage device of the computing device are further executable by the at least one processor of the computing device to:
output, for display by the display device and via the application, an option to delete the access token.

19. The system of claim 11, wherein the one or more modules stored at the storage device of the client device are further executable by the at least one processor of the client device to
send, to the authorization service, a refresh token;
responsive to sending the refresh token, receive, from the authorization service, a second access token to replace the at least one access token when the at least one access token has expired;
send, to the resource service, the second access token as part of another invocation of the application programming interface hosted by the resource service; and
responsive to sending the second access token to the resource service, receive, from the resource service, access to the digital information hosted by the resource service.

20. The system of claim 11,
wherein the digital information includes the digital videos, and
wherein the one or more modules stored at the storage device of the client device are further executable by the at least one processor of the client device to, responsive to sending the at least one access token to the resource service, receive, from the resource service, access to the digital videos hosted by the resource service.

* * * * *